June 27, 1933. G. J. ZIEGLER 1,915,772
CLUTCH
Filed May 10, 1929 3 Sheets-Sheet 1

Inventor.
George J. Ziegler.
by
Lockwood & Lockwood,
His Attorneys.

June 27, 1933.  G. J. ZIEGLER  1,915,772
CLUTCH
Filed May 10, 1929  3 Sheets-Sheet 2
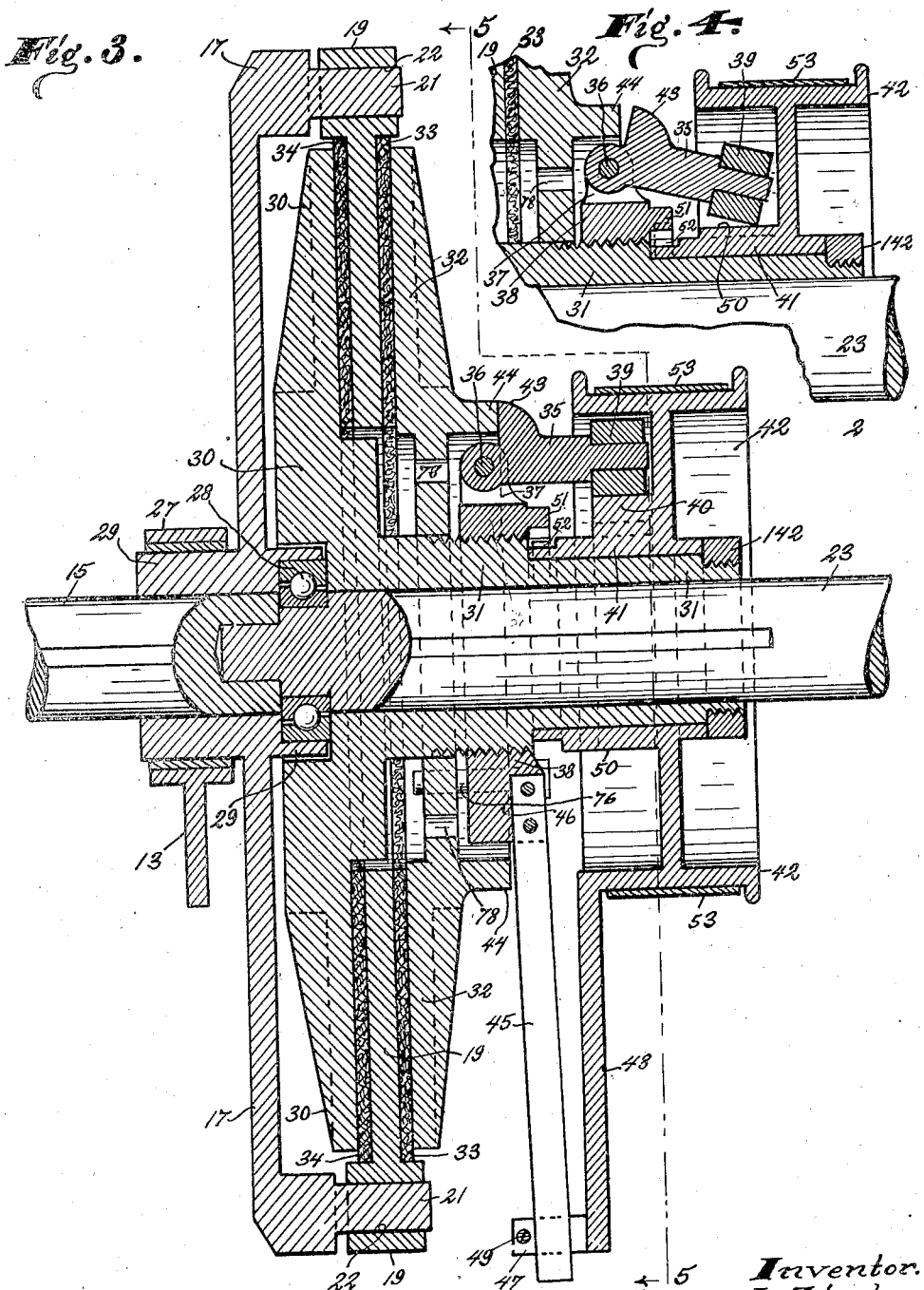
Inventor.
George J. Ziegler.
by
Lockwood & Lockwood
His Attorneys June 27, 1933.  G. J. ZIEGLER  1,915,772

CLUTCH

Filed May 10, 1929   3 Sheets-Sheet 3

Inventor.
George J. Ziegler.
by
Lockwood & Lockwood
His Attorneys.

Patented June 27, 1933

1,915,772

UNITED STATES PATENT OFFICE

GEORGE J. ZIEGLER, OF LOS ANGELES, CALIFORNIA, ASSIGNOR OF ONE-HALF TO CHARLES J. HEYLER, OF LOS ANGELES, CALIFORNIA

CLUTCH

Application filed May 10, 1929. Serial No. 361,998.

This invention relates to a clutch mechanism for trucks, vehicles and the like, and the principal object thereof is to provide a mechanism of the foregoing nature including clutches normally engaged with automatic means for resetting them after they have been manually disengaged.

One feature of the invention consists in substantially the means shown for moving a slidable clutch disk member into effective clutch engagement. To that end a lever is pivotally mounted at one end near said sliding disk and has a laterally projecting dog in position to engage and force said disk in clutching engagement when the other end of the lever is actuated, and there is on the other end of said lever a roller adapted to be engaged and actuated by a cam surrounding a shaft carrying said clutch disk. The cam moves the roller end of said lever outwardly radially from the axis of said cam and causes the dog to move the disk into clutching engagement. When the cam is released a radially extending spring returns said lever and clutch disk to their idle position.

Other objects, advantages and features of invention may appear from the accompanying drawings, the subjoined detailed description and the appended claims.

The accompanying drawings illustrate the invention.

Fig. 3 is a fragmental central section on line 3—3, Fig. 2, showing a detail of one of the clutches and showing the clutch members in engaged or clutching position.

Fig. 4 is a fragmental portion of the upper right hand portion of Fig. 3 showing the clutch dog in disengaged position.

Figure 1:
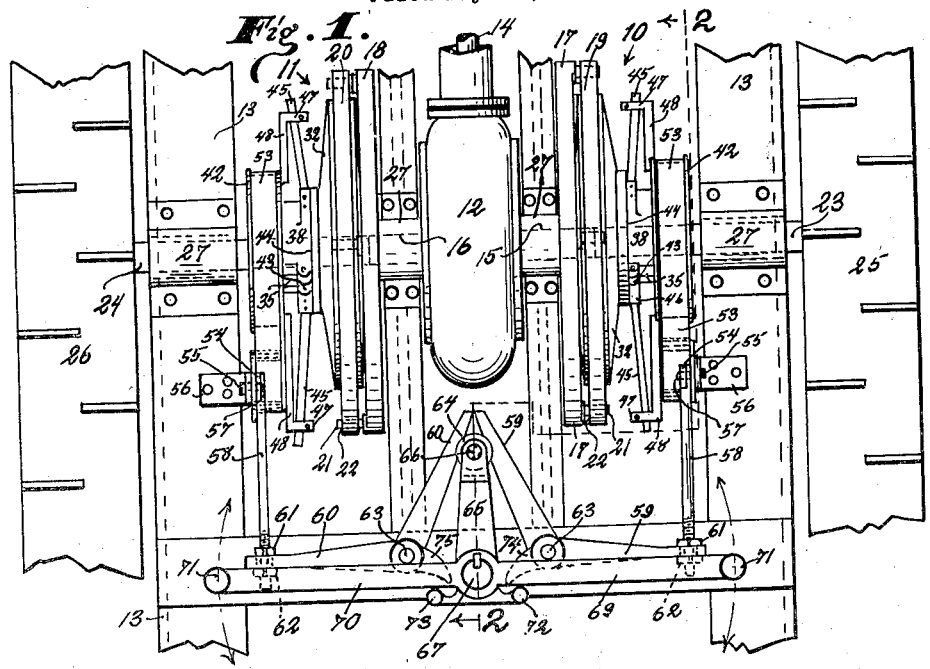
Fig. 1 is a fragmental plan view of clutches and operating means that are constructed in accordance with the invention, parts shown semidiagrammatically.
Figure 2:
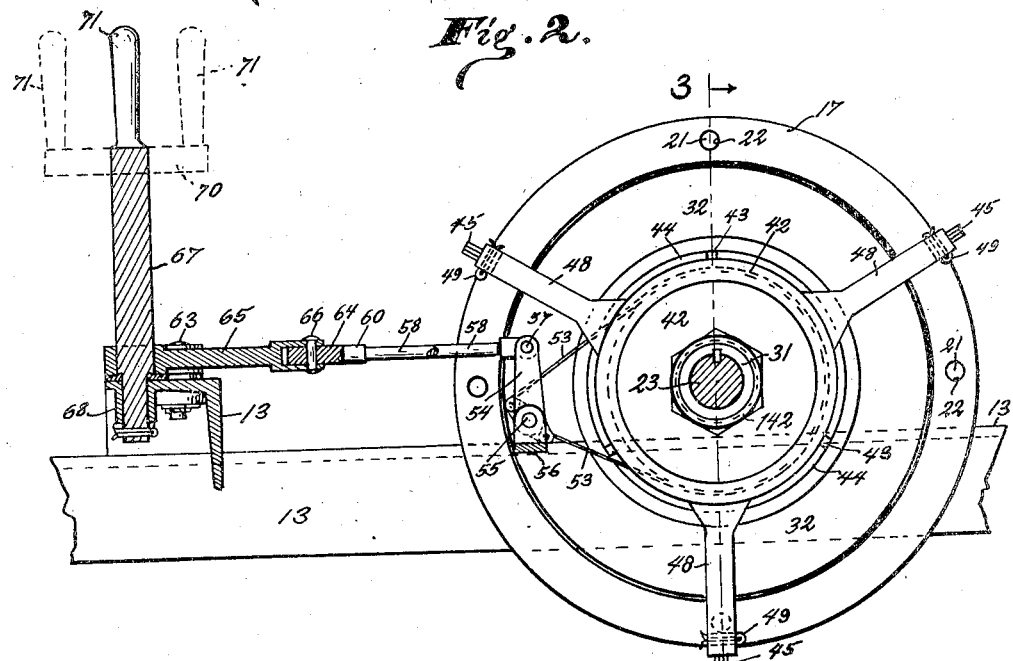
Fig. 2 is an enlarged longitudinal section on staggered line 2—2, Fig. 1.
Figure 5:
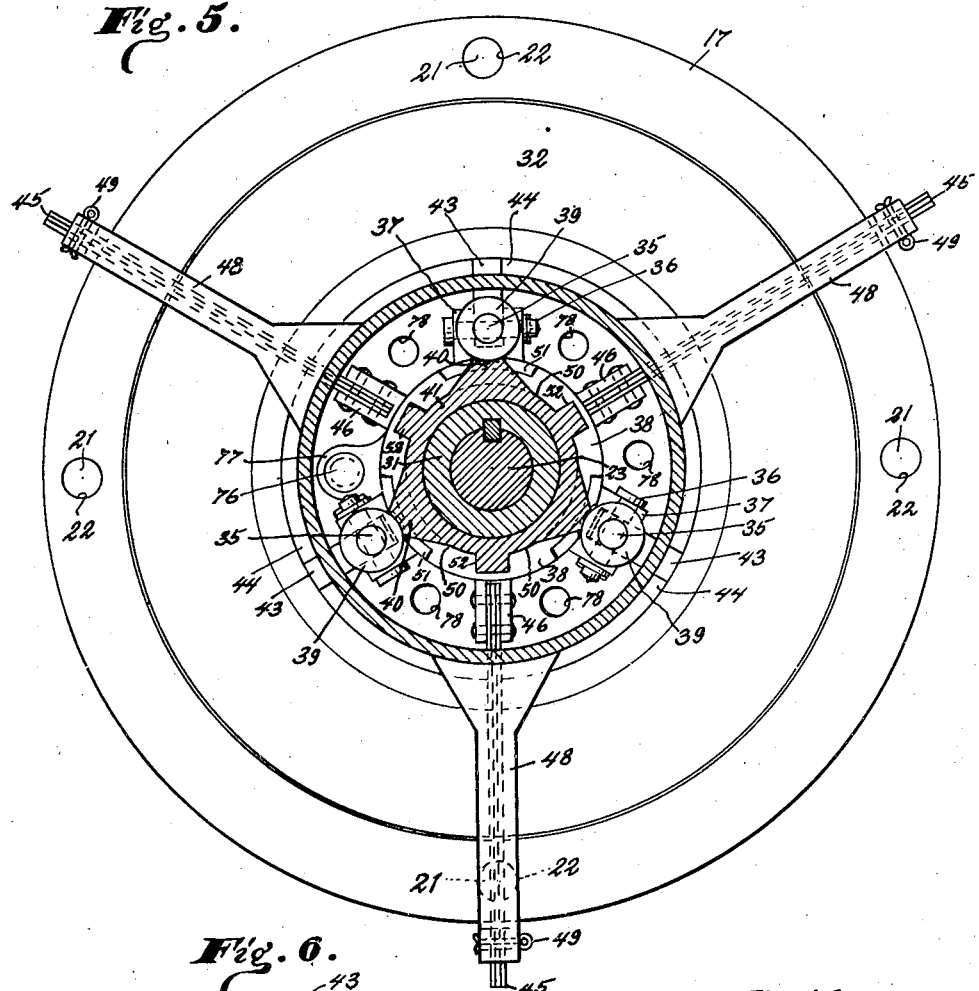
Fig. 5 is a cross section on line 5—5, Fig. 3, showing the arrangement of the clutch dogs and means for automatically holding them in position to engage the clutch members with the floating disk.
Figure 6:
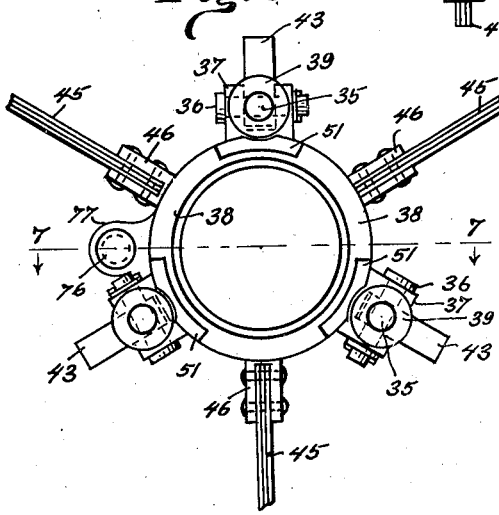
Fig. 6 is a fragmental end view of the hub nut that carries the clutch dogs and springs for automatically holding the drum in position for its cams to hold the dogs engaged with the sliding disk to set the clutch.
Figure 7:
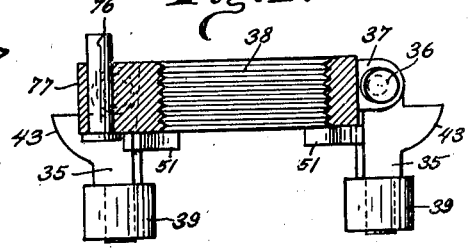
Fig. 7 is a cross section on the line 7—7, Fig. 6, showing the means for adjusting the hub nut so as to take up the wear on the friction plates.

The clutch construction includes the clutches 10 and 11 that are in driving connection with a differential 12 mounted on the tractor frame 13 semidiagrammatically indicated in Fig. 1.

The clutches 10 and 11 are constructed and operated substantially alike so that a detailed description of one will describe both clutches.

The differential 12 can be of any well known type driven by a shaft 14 that is connected with an engine not shown; and this differential is in driving connection with the inner ends of the shafts 15 and 16 by means well understood in the art. These shafts are shown by dotted lines in Fig. 1.

The other ends of the shafts 15 and 16 carry the pin wheels 17 and 18 on which the center clutch members 19 and 20 of the clutches 10 and 11 are loosely suspended and arranged to be rotated around the axis of the shafts 15 and 16. In other words the wheels 17 and 18 carry pins 21 that extend through bearing holes 22 in the center members 19 and 20, so that the members can be moved slightly endwise of the shafts 15 and 16 and can rotate as stated, but are prevented from radial movement. That is the wheels 17 and 18 and center members 19 and 20 are arranged to rotate when the differential is driven.

The axle shafts 23 and 24 on the outer end of which are secured the tractor wheels 25 and 26 are rotatably mounted in the frame 13 by suitable bearings 27, and they are aligned with the shafts 15 and 16.

The inner ends of the shafts 23, 24 are reduced in size and telescope into sockets in the ends of the shafts 15 and 16, and, as shown in Fig. 3, a ball bearing 28 is interposed between the shaft 23 and the hub 29 of the wheel 17, and the connection of the shaft 24 to its respective wheel 18 is formed in the same way.

In other words the pin wheels 17 and 18 and the floating or suspended disks 19 and 20 are arranged to rotate freely when the clutches 10 and 11 are disengaged.

The clutch 10 includes a stop or abutment disk 30 that is arranged adjacent one side of the floating disk 19 and that has an elongated hub 31 that is keyed to the shaft 23, and loosely mounted on the hub 31 and arranged on the other side of the floating disk 19 is a sliding disk 32. Interposed between the disks 30 and 32 and carried by the floating disk 19 are the oppositely arranged friction plates 33, 34 that can be formed of any suitable material.

The floating disk 19 and plates 33, 34 are arranged to rotate freely between the disks 30, 32 when the clutch is disengaged but normally the disk 32 is forced automatically toward the abutment disk 30 so as to pinch the plates 33, 34 between them so that all these parts will rotate together when the differential 12 is driven.

The sliding disk 32 is normally forced toward the disk 31 by means of levers 35 that are pivotally connected by pins 36 to ears 37 on a hub nut 38 that is secured on the hub 31. The levers 35 have rollers 39 on their free ends that are normally forced outwardly from the axis of the shaft 23 by cams 40 that are integral with the hub 41 of a drum 42. The levers 35 have dogs 43 arranged to engage an annular flange 44 that is integral with the disk 32 so that when the rollers 39 are riding on the cams 40 the clutch members will be in clutching engagement.

The cams 40 are automatically held in position to force the rollers 39 outwardly by radially extending spring arms 45 that have their inner ends secured in the bosses 46 that are integral with the hub nut 38 and the outer ends of these spring arms extend loosely through guides 47 that are integral with the outer ends of rigid radial arms 48 that are integral with the drum 42. The outer ends of the spring arms are retained in the guides 47 by cotter pins 49.

By this connection of the spring arms 45 to the drum 42 the cams 40 are held in position to automatically force the rollers 39 outwardly and thereby engage the clutch disks 30 and 32 with the floating disk 19 to drive the tractor or vehicle.

The clutch is disengaged by a means for interrupting the rotation of the drum 42 that is carried by the spring arms 45. When the rotation of the drum 42 is interrupted the rollers 39 roll off the cams 40 into recesses 50 so that the dogs 43 are disengaged from the flange 44 and thereby permitting the clutch members to disengage the floating disk 19. As soon as the drum 42 is released the tension of the spring arms again moves the drum in position for the rollers 39 to ride on the cams 40 and reset the clutch.

Preferably the spring arms 45 are formed of three sheets of sixteen gauge steel strips of proper length and width to perform their function, but can be one piece if so desired.

The drum 42 is loosely mounted on the reduced end of the hub 31 and is rotatably held thereon by a nut 142.

The hub nut 38 is provided with extensions 51 that are arranged to engage stops 52 on the hub 41 to limit the movement of these parts so that the rollers are not carried beyond the recesses 50 into which they are arranged to fall when carried off of the cams 40.

The drums 42 are provided with brake bands 53 that are connected to levers 54 pivotally connected by pins 55 to brackets 56 secured to the frame 13 so that when the levers are actuated the bands either grip or release the drums.

The levers 54 are pivotally connected by pins 57 to the outer ends of the draw bars 58. These bars have their other ends adjustably secured in the side arms of the bell cranks 59, 60 by opposing nuts 61, 62.

The bell cranks are pivoted on pins 63 that are secured in the frame 13, and the other ends of these bell cranks engage a roller 64 pivoted in the end of a control arm 65 by a pin 66. The control arm 65 is secured to a steering post 67 that has its lower end revolubly mounted in a bearing 68 secured to the frame 13.

The steering post 67 has arms 69, 70 integral with its upper end on which there are handles 71 so that the post 67 can be rotated to move the arm 65 in one direction or the other to actuate the bell cranks and thereby tighten or release the brake bands on the drums.

A means is provided whereby the rotation of the steering post can be made to interrupt the rotation of both drums so that both clutches are released. This means includes short arms or extensions 72, 73 on the rear end of the control arm 65 that are arranged to engage spurs 74, 75 on the bell cranks 59, 60 so that when the control arm 65 is moved to actuate the bell crank 59, if moved far enough, the extension 73 will also engage the spur 75 and actuate the other bell crank 60 and vice versa.

A means is provided for taking up the wear on the friction plates 33, 34. This means includes a pin 76 that extends through a boss 77 on the hub nut 38 and this pin is arranged to extend through the holes 78 in the hub of the sliding disk 32. In other words when the pin 76 is removed the nut 38 can be adjusted to take up the wear on the plates, after which the pin is replaced in one of the numerous holes 78.

In operation the clutches 10 and 11 are normally engaged so that the tractor wheels 25, 26 are driven by the differential through the clutches until one or the other or both drums 42 are interrupted in their rotation. If the drum controlling the clutch 10 is stopped the clutch will be released so that the wheel 25 will stand still and vice versa, and when both drums 42 are stopped both tractor wheels will be stopped, and the disengaging of the clutches is accomplished by a slight manual movement of the steering post and the resetting of the clutches after they have been disengaged is accomplished automatically, as previously stated.

I claim as my invention:

1. A clutch for a vehicle including a driving shaft, a driven shaft, an abutment disk having an elongated hub secured to the driven shaft, a sliding disk loosely and slidably mounted on the elongated hub, a floating disk connected to the driving shaft and arranged between the abutment and sliding disks, oppositely arranged friction plates carried by said floating disk, a hub nut adjustably secured on the elongated hub, dogs carried by said hub nut, a drum loosely mounted on the elongated hub, cams carried by said drum, and radially extended spring arms connecting said hub nut and drum that are adapted to move said cams in position to force said dogs against the sliding disk to move it toward the abutment disk and establish a driving connection between the driving and driven shafts.

2. A clutch for a vehicle including a driving shaft, a driven shaft, an abutment disk having an elongated hub secured to the driven shaft, a sliding disk loosely and slidably mounted on the elongated hub, a floating disk connected to the driving shaft and arranged between the abutment and sliding disks, oppositely arranged friction plates carried by said floating disk, a hub nut adjustably secured on the elongated hub, levers pivotally connected to said hub nut, dogs integral with said levers, rollers on the free ends of said levers, a drum loosely mounted on the elongated hub, cams carried by said drum, and radially extended spring arms connected to said hub nut and drum that are arranged to normally force said cams under said rollers to engage said dogs with the sliding disk to move it toward said abutment disk to establish a driving connection between said driving and driven shafts.

3. A clutch for a vehicle including a driving shaft, a driven shaft, an abutment disk having an elongated hub secured to the driven shaft, a sliding disk rotatably and slidably mounted on the elongated hub, a floating disk connected to the driving shaft and arranged between said abutment and sliding disks, friction plates carried by and arranged on each side of said floating disk, a hub nut adjustably secured to the elongated hub, levers pivotally connected to said hub nut, dogs integral with said levers, rollers on the free ends of said levers, a drum loosely mounted on the elongated hub and arranged to rotate therewith, rigid radial arms on said drum, cams carried by said drum, radial spring arms having their inner ends connected to said hub nut and their outer ends loosely connected to said rigid arms, said spring arms arranged to normally force said cams under said rollers to engage said dogs with the sliding disk to move it toward said abutment disk to establish a driving connection between said driving and driven shafts, and means connected with said hub nut and sliding disk for taking up the wear on said friction plates.

4. A clutch for a vehicle including a driving shaft, a driven shaft, an abutment disk having an elongated hub secured to the driven shaft, a sliding disk rotatably and slidably mounted on the elongated hub, a floating disk connected to the driving shaft and arranged between said abutment and sliding disks, friction plates carried by and arranged on each side of said floating disk, a hub nut adjustably secured to the elongated hub, levers pivotally connected to said hub nut, dogs integral with said levers, rollers on the free ends of said levers, a drum loosely mounted on the elongated hub and arranged to rotate therewith, rigid radial arms integral with said drum, cams carried by said drum, radial spring arms having their inner ends connected to said hub nut and their outer ends connected to said rigid arms, said spring arms arranged to normally force said cams under said rollers to engage said dogs with the sliding disk to move it toward said abutment disk to establish a driving connection between said driving and driven shafts, and means for interrupting the rotation of said drum for disengaging said cams from said rollers so that the clutch members will disengage.

5. A clutch for a vehicle including a driving shaft, a driven shaft, an abutment disk having an elongated hub secured to the driven shaft, a sliding disk loosely and slidably mounted on the elongated hub of said abutment disk, a pin wheel secured to said driving shaft having pins extended over the periphery of said abutment disk, a floating disk loosely supported on the pins of said pin wheel so it is supported between said sliding and abutment disks, friction plates carried on each side of said floating disk, a hub nut adjustably secured on the elongated hub of said abutment disk, dogs carried by said hub nut, a drum loosely mounted on the said hub nut, a cam hub to said drum, elongated hub, a cam hub to said drum, spaced cams, recesses and stops in and on said cam hub, levers integral with said dogs, rollers on the free ends of said levers that normally rest against the stops in the recesses of said cam hub, means for interrupting the rotation of said drum, and other means for forcing said rollers out of the recesses in said cam hub and onto said spaced cams to actuate said dogs to move said sliding disk into clutching engagement with the friction plate on said floating disk.

In witness whereof, I have hereunto affixed my signature.

GEORGE J. ZIEGLER.